United States Patent Office 3,632,672
Patented Jan. 4, 1972

3,632,672
CRYSTAL CLEAR MOULDING COMPOSITIONS OF HIGH IMPACT STRENGTH COMPRISING MIXTURES OF POLYVINYL CHLORIDE WITH GRAFT COPOLYMERS OF VINYL CHLORIDE ON ELASTOMERS AND PROCESS FOR THEIR MANUFACTURE
Gerhard Kuhne and Jurgen Kuhls, Burghausen (Salzach), and Hans Huber, Burgkirchen (Alz), Germany, assignors to Farbwerke Hoechst Aktiengesellschaft vormals Meister Lucius & Bruning, Frankfurt am Main, Germany
No Drawing. Filed Sept. 3, 1968, Ser. No. 757,093
Claims priority, application Germany, Sept. 2, 1967, F 53,396
Int. Cl. C08f 29/24, 41/12
U.S. Cl. 260—876 R                    10 Claims

ABSTRACT OF THE DISCLOSURE

Crystal clear moulding compositions of high impact strength comprising (A) a graft copolymer of vinyl chloride and an elastomer consisting of at most 90% by weight of butadiene or another conjugated diolefin and at least 10% by weight of comonomers part of which are comonomers whose homopolymers have higher refractive indices than polyvinyl chloride while the other part is monomers that improve the compatibility of the elastomer with vinyl chloride, and (B) a suspension or mass polyvinyl chloride or a corresponding copolymer, and a process for their manufacture. Crystal clear moulding compositions of high impact strength comprising mixtures of polyvinyl chloride with graft copolymers of vinyl chloride on elastomers and process for their manufacture.

---

The present invention relates to crystal clear moulding compositions of high impact strength comprising mixtures of polyvinyl chloride with graft copolymers of vinyl chloride on elastomers and a process for their manufacture.

It has already been proposed to make thermoplastic moulding compositions of high impact strength by combining brittle or rigid polymers, for example, polyvinyl chloride or copolymers of vinyl chloride, with soft rubber-like copolymers of butadiene. There have also been known various processes in which vinyl chloride is polymerized in the presence of the elastomeric component to improve the compatibility; depending on the degree of grafting, part of the vinyl chloride is grafted on to the elastomer, while the remaining proportion is homopolymerized. These copolymers or graft polymers have thermoplastic to rubber-like properties, depending on the quantitative ratios used. They can therefore be used either alone or in combination with thermoplastic polymers, but do not yield crystal clear products.

Crystal clear moulding compositions of high impact strength can be obtained by adapting the optical refractive indices of the elastomeric and the rigid phase as has been described, for example, in German Auslegeschrift 1,172,086. A prerequisite to this is, however, that both phases should be free from additives producing haze, for example emulsifiers. Some processes therefore prefer the synthesis of elastomers in substance or solution followed by a combination with mass or suspension polyvinyl chloride free from emulsifier. As compared with the elastomer latices produced in emulsion, the products obtained by these processes suffer from the disadvantage that rubber particles which are 10 to 100 times larger are formed and the rubber components is not therefore satisfactorily utilized. For this reason, other processes, for example that of U.S. Patent 3,288,886, do not renounce the technically advantageous emulsion polymerization. To remove the emulsifiers from the latices, the latter must be pecipitated, however, with water-soluble additives and subjected to a subsequent, often unsatisfactory washing.

To avoid the above disadvantages it is necessary to prevent the haze caused by the emulsifiers by using an elastomer the composition of which is exactly adjusted to the refractive index of polyvinyl chloride, while simultaneously maintaining or even improving the impact strength of crystal clear moulding compositions having a relatively low content of elastomer.

The present invention provides a process for the manufacture of crystal clear moulding compositions of high impact strength comprising mixtures of a mass or suspension polyvinyl chloride with an emulsion graft copolymer of vinyl chloride on an elastomer, which comprises:

(A) Manufacturing an elastomer of at most 90% by weight of butadiene or of a homologous conjugated diolefin and at least 10% by weight of comonomers, part of which are comonomers whose homopolymers have higher refractive indices than polyvinyl chloride while the other part are monomers that improve in known manner the compatibility of the elastomer with vinyl chloride, in known manner by emulsion polymerization in a manner such that a particle size smaller than $0.4\mu$ is obtained, introducing the elastomer latex so obtained into a reaction zone in which vinyl chloride is being emulsion polymerized, the polymerization having reached an extent of conversion of 40 to 80%, in such an amount that the solid matter of the resulting graft copolymer contains 5 to 50% by weight of elastomer component, continuing the polymerization of the vinyl chloride until an extent of conversion of at most 95% has been reached and drying the resulting graft copolymer to obtain a powder, and (B) Mixing 30 to 95% by weight of a mass or suspension polyvinyl chloride or of a corresponding copolymer of vinyl chloride or a blend of these known types of polyvinyl chloride, with 5 to 70% by weight of the graft copolymer obtained as described above sub (A).

The elastomer latex is obtained in known manner by polymerizing the monomers in an aqueous emulsion. The butadiene may be wholly or partially replaced by homologous conjugated diolefins, for example isoprene.

A part of the amount of comonomers is constituted by monomers whose homopolymers have higher refractive indices than polyvinyl chloride, advantageously styrene, furthermore, for example, vinyl carbazole, vinyl pyrrolidone, α-methylstyrene, styrenes substituted at the nucleus and chloroprene. The remaining part of the amount of comonomers consists of monomers which are known to improve the compatability of the elastomer with vinyl chloride, for example, acrylonitrile, acrylates, methacrylates vinyl benzoate and vinyl acetate.

In an advantageous form of the process of the invention the manufacture of the elastomer starts from a mixture of the diolefin and the monomer that regulates the refractive index while the other monomer which improves the compatibility with vinyl chloride is only added after the said mixture has been reacted to an extent of 50 to 90%; the polymerization is then terminated whereby, in addition to the copolymerization, this second comonomer is partially grafted on to the diene copolymer.

The quantitative ratio of the monomers forming the elastomer is adjusted to the optical refractive index of polyvinyl chloride.

By using for the manufacture of the diene polymers 100 parts of monomers, 100 to 150 parts of water and 0.5 to 3.0 parts, advantageously 1 to 2 parts, of emulsifier, stable latices of a particle size of less than $0.4\mu$ are obtained.

The following known emulsifiers may be used: sodium and potassium salts of straight-chain or branched carboxylic acids with 10 to 20 carbon atoms, for example, lauric acid, stearic acid, oleic acid, dimeric oleic acid, sodium and potassium salts of disproportionated abietic acid, of alkylsulfonic acids, sulfuric acid esters and phosphoric acid alkyl esters, and oxethylates of 20 moles of ethylene oxide, calculated on 1 mole of alkyl phenol or 1 mole of fat alcohol with 10 to 20 carbon atoms.

As polymerization catalysts there may be used organic or inorganic per compounds or azo compounds, for example, potassium or ammonium persulfate, tertiary butylhydroperoxide, azodiisobutyric acid nitrile, in amounts of 0.05 to 3% calculated on the total amount of monomer. It is also possible to use redox systems of the said peroxides and reducing agents, for example, glucose or aldehyde derivatives.

The polymerization temperature is within the range of from 30 to 100° C., advantageously 40 to 80° C. The pH may be within the range of from 6 to 11, salts of orthophosphoric acid and pyrophosphoric acid being used as buffer substances.

The polymerization may be interrupted before a complete conversion has been attained. It is advantageous, however, to react the monomers to an extent of conversion of above 90%. The toluene-insoluble proportion (gel content) is within the range of 70 to 90%.

Any monomers that have not been reacted are removed under reduced pressure at temperatures within the range of from 40 to 60° C. after the addition of a known defoaming agent, for example a fatty acid glyceride.

The elastomer latex so obtained is introduced into a reaction zone in which vinyl chloride is being emulsion polymerized in known manner, the emulsion polymerization having reached an extent of conversion of 40 to 80%, advantageously 50 to 60%. The vinyl chloride polymerization is then continued to an extent of conversion of at most 95%, whereby the remaining amount of vinyl chloride is partially grafted on to the elastomer introduced. The vinyl chloride may be partially replaced by monomers that can be copolymerized in known manner with vinyl chloride, for example vinyl acetate. The elastomer latex is added in an amount such that the solid matter of the resulting graft copolymer contains 5 to 50% by weight, advantageously 15 to 30% by weight, of elastomer component.

The vinyl chloride emulsion polymerization is carried out with the use of a conventional emulsifier in an amount within the range of from 0.2 to 4% by weight, advantageously 0.4 to 1.3% by weight, calculated on monomeric vinyl chloride. The polymerization is carried out at a pH of 7 to 11 and a temperature within the range of from 40 to 100° C., advantageously 40 to 90° C.

After the addition of 0.01 to 0.2% by weight of an anti-oxydant serving to protect the diene polymer against air oxidation, for example di-tert. butylparacresol, the graft copolymer latices are dried without further treatment on drying rolls to obtain products having good flow properties, or are sprayed in the form of coarse particles at 80 to 90° C. in spray towers using so-called single substance nozzles. The resulting coarse-grained emulsion graft copolymer has a medium particle size within the range of from 80 to 200$\mu$ and a powder density within the range of from 500 to 600 g./l.

5 to 70% by weight, advantageously 20 to 40% by weight, of graft copolymer is mixed in a known impeller with 30 to 95% by weight, advantageously 60 to 80% by weight, of mass or suspension polyvinyl chloride of good flow properties while simultaneously adding stabilizers or waxes and optionally pigments or dyestuff to obtain workable powder mixtures. The resulting mixtures may subsequently be granulated, if desired.

It was surprising that crystal clear products of high impact strength can be obtained by the process in accordance with the invention since the process described in German Patent 1,226,790 in which an elastomer latex is likewise introduced into a reaction zone in which vinyl chloride is being polymerized, does not yield crystal clear products of high impact strength. It is only by the variation in accordance with the invention of the process steps that crystal clear moulding compositions of high impact strength based on emulsion polyvinyl chloride can be obtained.

The following table 1 shows that the moulding compositions of the invention are superior to those obtained by the process of the above German Patent 1,226,790.

TABLE 1

|  | Percent by weight of elastomer calc. on graft copolymer | Notched impact tensile strength (kp. cm./cm.$^2$) | Factor of toughness [1] | Haze Number |
| --- | --- | --- | --- | --- |
| Moulding composition of invention | 6.3 | 171 | 41.3 | 105 |
| Moulding composition of German Pat. Pat. 1,226,790 | 6.3 | 160 | 33 | 509 |
|  | 0.6 | 70 | 18 | 200 |

[1] Factor of toughness = $\dfrac{\text{Elongation at break (percent)} \cdot 1{,}000}{\text{Impact tensile strength (kp. cm./cm.}^2\text{)}}$ Owing to the low content of elastomer in the moulding compositions of the invention, the latter gelatinize more rapidly and have a lower melt viscosity and consequently possess an improved workability.

The polyvinyl chloride latex obtained by the graft copolymerization can be dried by spraying it in the form of coarse particles and thus made into a product of good flow properties which is comparable also with respect to the powder density to mass or suspension polyvinyl chloride. The moulding compositions of the invention are therefore non-dusting and consequently well workable.

Further advantages of the moulding compositions of the invention are the small solvent extract, the improved thermostability under load and the high impermeability to gas and aroma as compared with the known polyvinyl chloride polymers that have been modified to render them resistant to impact.

The products in accordance with the invention can be made into a great many different articles by the known injection moulding, casting, extrusion, blow moulding, compression, impact moulding and calendering processes commonly used for shaping thermoplastic masses. The products of the invention are very suitable for the manufacture of crystal clear articles of good mechanical properties, for example, films, sheets, plates, profiles and hollow bodies, and especially bottles with or without screw plugs.

The following examples serve to illustrate the invention, but are not intended to limit it, the parts being by weight.

EXAMPLES 1–4

(a) Elastomer

A solution of 150 parts of deionized water, 1 part of the sodium salt of dibutylnaphthalenesulfonic acid and 0.6 part of potassium persulfate was placed in an autoclave provided with stirring means. The air was displaced by introducing nitrogen and the autoclave was evacuated. 57 parts of butadiene and 33 parts of distilled styrene were then introduced under pressure while stirring and the temperature was raised to 55 to 60° C. After a working time of 5 hours 0.5 part of sodium-n-dodecaphenyl sulfonate was introduced and after 12 hours 10 parts of distilled vinyl acetate were added. After about 20 hours, about 90 to 92% of the monomers had been reacted. The residual butadiene was removed by stirring the latex at 40° C. under reduced pressure. The resulting latex had a polymer concentration of about 35%.

(b) Graft copolymer

A solution of 120 parts of deionized water, 0.4 part of a mixture of the sodium salts of n-alkylsulfosuccinic acid esters with 12 to 14 acrbon atoms, 0.3 part of a mixture of the sodium salts of n-sulfonic acids with 12 to 14 carbon atoms and 0.01 part of potassium persulfate was introduced into an autoclave provided with stirring means and 100 parts of vinyl chloride were then added while stirring. After displacing the air with nitrogen the reaction was started by heating. After an extent of conversion of about 60 to 70% had been reached, 61 liters of the elastomer latex described above sub (a) were introduced within 15 minutes. The graft copolymer latex obtained after a time of reaction of 15 to 20 hours with an extent of conversion of 90 to 92% had a concentration of 40 to 42%.

The solid matter contained 21% by weight of the elastomer component.

(c) Mixtures

To 10 to 40% by weight of the vinyl chloride graft copolymer obtained as described above sub (b) which had been dried by spraying in the form of coarse particles there were added 60 to 90% by weight of a mass polyvinyl chloride having a K value of 58, 1.5% by weight of a commercial tin stabilizer and 0.5% by weight of a commerical montan wax. Samples of the resulting powder mixture were made into a rolling sheet on a roll mill having a temperature of 170° C. Plates about 1 mm. thick which had been die-cut from the sheet were compressed and used as test samples for determining the mechanical values indicated in the following Table 2.

TABLE 2

| | Percent graft copolymer | Percent mass polyvinyl chloride | Elastomer content calc. on graft copolymer | Notched impact tensile strength (kp. cm./cm.$^2$) | Factor of toughness | Haze Number |
|---|---|---|---|---|---|---|
| a [1] | 0 | 100 | 0 | 32 | 17 | 100 |
| b [1] | 100 | 0 | 6.3 | 160 | 33 | 509 |
| Number: | | | | | | |
| 1 | 10 | 90 | 2.1 | 93.5 | 21.5 | 120 |
| 2 | 20 | 80 | 4.2 | 149 | 25 | 110 |
| 3 | 30 | 70 | 6.3 | 171 | 41.3 | 105 |
| 4 | 40 | 60 | 8.4 | 171 | 42 | 110 | a [1] and b [1] are comparison tests, a without graft copolymer and b with graft copolymer according to German Pat. 1,226,790.

EXAMPLES 5 TO 16

In the manner described in Example 3, mixtures of 30% by weight of graft copolymer, containing 21% by weight of elastomer component, and 70% by weight of mass or suspension polymer were prepared, using elastomer components of different composition (cf. Table 3, column 1).

The elastomers used in Examples 5 to 12 were prepared by adding the third comonomer when the copolymerization of butadiene/chloroprene and butadiene/styrene, respectively, had reached an extent of conversion of 50 to 60%. The elastomers of Examples 13 to 15 were obtained by a terpolymerization of the monomers indicated in column 1. In Example 16, only two monomers were used. Columns 2 to 4 of Table 3 indicate the values of toughness and transparency of the moulding compositions in accordance with the invention.

TABLE 3

| Composition of elastomer latex in parts by weight | Notched impact tensile strength (kp. cm./cm.$^2$) | Factor of toughness | Haze Number |
|---|---|---|---|
| (5) 30 butadiene, 60 chloroprene, 10 acrylonitrile | 190 | 29.3 | 112 |
| (6) 60 butadiene, 27.5 styrene, 12.5 acrylonitrile | 157 | 40.8 | 110 |
| (7) 59 butadiene, 31 styrene, 10 methylmethacrylate | 144 | 43.6 | 100 |
| (8) 57 butadiene, 33 styrene, 10 vinyl acetate | 171 | 41.3 | 105 |
| (9) 60 butadiene, 34 styrene, 6 vinyl acetate | 139 | 35.8 | 112 |
| (10) 78 butadiene, 12 styrene, 10 vinyl pyrrolidone | 162 | 33.2 | 110 |
| (11) 82 butadiene, 8 styrene, 10 vinyl carbazole | 146 | 30.4 | 112 |
| (12) 64 butadiene, 26 styrene, 10 benzoic acid vinyl ester | 142 | 39.8 | 96 |
| (13) 52 butadiene, 17 methyl methacrylate, 31 styrene | 135 | 36.2 | 98 |
| (14) 62 butadiene, 28 styrene, 10 acrylonitrile | 151 | 41.0 | 100 |
| (15) 52 butadiene, 34 styrene, 14 vinyl acetate | 160 | 36.0 | 100 |
| (16) 40 butadiene, 60 chloroprene | 156 | 34.5 | 110 |

What is claimed is:

1. A process for the production of crystal clear moulding compositions of high impact strength which comprises (A) producing by emulsion polymerization an elastomer having a particle size less than 0.4$\mu$, said elastomer being of at most 90% by weight butadiene or a homologous conjugated diolefin and at least 10% by weight comonomers, a portion of said comonomers being a comonomer whose homopolymer has a higher refractive index than polyvinyl chloride and is selected from the group consisting of styrene, vinyl carbazole, vinyl pyrrolidone, methyl styrene, chloroprene and nuclear substituted styrenes while the other portion is a monomer that improves the compatibility of the elastomer with vinyl chloride and is selected from the group consisting of acrylonitrile, acrylates, methacrylates, vinyl benzoate and vinyl acetate, introducing the so produced elastomer latex into a reaction zone in which vinyl chloride is being emulsion polymerized, the polymerization of vinyl chloride having reached a conversion of 40 to 80%, in such an amount that the solid matter of the resulting graft copolymer contains 5 to 50% by weight of elastomer component, continuing the polymerization of the vinyl chloride until a conversion of at most 95% has been reached and drying the resulting graft copolymer to obtain a powder, and (B) mixing 30 to 95% by weight of a mass or suspension polyvinyl chloride, copolymer of vinyl chloride or a blend of polyvinyl chloride, with 5 to 70% by weight of the graft copolymer obtained as described in (A).

2. The process of claim 1 wherein in the manufacture of the elastomer component the comonomer improving the compatibility with polyvinyl chloride is only added after the mixture of the other monomers has been reacted to an extent of 50 to 90%, and the polymerization is then terminated.

3. The process of claim 1 wherein styrene is used as comonomer the homopolymer of which has a higher refractive index than polyvinyl chloride.

4. The process of claim 1 wherein the elastomer latex is introduced into a reaction zone in which vinyl chloride is being polymerized after the polymerization of the vinyl chloride has reached an extent of conversion of 50 to 60%.

5. The process of claim 1 wherein the elastomer latex is added in an amount such that the solid matter of the resulting graft copolymer contains 15 to 30% by weight of elastomer component.

6. The process of claim 1 wherein 60 to 80% by weight of the suspension or mass polyvinyl chloride is mixed with 20 to 40% by weight of graft copolymer.

7. The process as claimed in claim 1, wherein the di-olefinic component of said elastomer is butadiene.

8. The process as claimed in claim 1, wherein the elastomer is produced at temperatures within the range of from 30 to 100° C.

9. The process as claimed in claim 1, wherein the graft copolymer is produced at temperatures within the range of from 40 to 100° C.

10. Crystal clear termoplastic moulding compositions of high impact strength comprising mixtures produced by the process of claim 1.

References Cited

UNITED STATES PATENTS 3,281,345   10/1966   Kühne _____ 260—876 X

FOREIGN PATENTS 1,120,416   7/1968   Great Britain _____ 260—876

SAMUEL H. BLECH, Primary Examiner

H. ROBERTS, Assistant Examiner

U.S. Cl. X.R.

260—29.7 UP, T, 80.7, 879